United States Patent [19]

Tateno et al.

[11] Patent Number: 4,836,352

[45] Date of Patent: Jun. 6, 1989

[54] EXPRESS PACKAGE COLLECTION LOCKER

[75] Inventors: Kunio Tateno, Ibaraki; Yoshio Shimotori, Funabashi, both of Japan

[73] Assignees: UPL Co. Ltd, Oyama; Koto Electronics Co. Ltd., Ibaraki, both of Japan

[21] Appl. No.: 181,714

[22] Filed: Apr. 14, 1988

[30] Foreign Application Priority Data

Apr. 16, 1987 [JP] Japan ................................ 62-91981

[51] Int. Cl.[4] ........................ G06K 1/12; G06K 19/00

[52] U.S. Cl. .................................... 194/215; 194/210; 221/5; 232/27; 235/487; 364/466

[58] Field of Search .................. 194/210, 215; 232/27, 232/3 D, 21, 31, 32, 2 D, 24, 25, 2 L; 235/381, 375, 385, 383; 364/466, 566, 567, 562, 563

[56] References Cited

U.S. PATENT DOCUMENTS

| | | | |
|---|---|---|---|
| 2,812,904 | 11/1957 | Kolisch | 364/466 |
| 3,436,968 | 4/1966 | Unger et al. | 364/466 |
| 3,854,656 | 12/1974 | Bishop et al. | 232/27 |
| 4,024,380 | 5/1984 | Gunn | 235/487 |
| 4,509,676 | 4/1985 | Staly | 232/27 |
| 4,598,810 | 7/1986 | Shore et al. | 221/5 |

*Primary Examiner*—Duane A. Reger
*Assistant Examiner*—Matthew C. Graham
*Attorney, Agent, or Firm*—Joseph Scafetta, Jr.

[57] ABSTRACT

An express package collection locker capable of automatically calculating the portage fee of a package. The locker comprises a plurality of boxes for storing packages, a plurality of weight sensors incorporated in the boxes, respectively, and a plurality of push buttons for selecting regions from a map which correspond to possible destinations of the package. The locker further comprises a CRT display for displaying operating instructions, and a main controller. The main controller calculates the portage fee of a package placed in any one of the boxes, in accordance with the weight of the package measured by the weight sensor provided within the box, and the region destination of the package, which has been selected by operating the desired button. The portage, thus calculated, is displayed by the CRT display. The main controller locks the door of the box when the portage is duly paid into the locker, and then prints and issues a voucher.

20 Claims, 11 Drawing Sheets

EXPRESS PACKAGE COLLECTION LOCKER

BACKGROUND OF THE INVENTION

1. Field of the Invention

The present invention relates to an express package collection locker which looks like a coin locker and can automatically weigh packages and/or measure the dimensions thereof, calculate the portages of the packages from the weight and/or dimensions and destination of the packages, and store the packages until they are sent to a collection and delivery center.

2. Description of the Related Art

Generally, the portage of an express package is calculated from the weight, dimensions, and destination of the package. Conventionally, people take their packages to merchandise stores which offers package-collecting service. The clerks of the stores weigh the packages and, if necessary, measure the dimensions thereof, and calculate the portages from the weights, dimensions, and destination of the packages, in accordance with the portage chart given by the delivery company specialized in delivering express packages.

Three problems are inherent in this system. First, since the stores are closed at night and on a certain day, people must wait until the following morning or the following day to take their packages to the stores, and the packages cannot be delivered on desired dates. Secondly, the portage calculation is error-prone since it is performed by human. Thirdly, the portage chart states only flat rates, each for delivering packages within a specific range of weight or dimensions, and the portage often turns out to be too much for the sender and, hence, favorable to the delivery company.

The system is also disadvantageous to the delivery company. The delivery-collect men drive their trucks to deliver packages to the receivers and collect packages at the merchandise stores at prescribed times. More often than not, there are no packages waiting at the stores, in which case the delivery company suffers from a loss in terms of labor cost.

SUMMARY OF THE INVENTION

It is accordingly the object of the present invention to provide an express package collection locker which can automatically weigh packages and/or measure the dimensions thereof, calculate the portages of the packages from the weight and/or dimensions and destination thereof, and store the packages until they are sent to a collection and delivery center.

Another object of the invention is to provide an express package collection locker which can serve 24 hours a day, and can automatically calculate the portages of packages to the minute degree in accordance with the weight and/or dimensions and destination thereof, and store the packages until they are sent to a collection and delivery center.

A further object of the invention is to provide an express package collection locker which can automatically calculate the portages of packages from the weight and/or dimensions and destination thereof, store the packages until they are sent to a collection and delivery center, and automatically transmit messages to an express collection and delivery center, indicating the receipt of express packages and the weights and/or dimensions thereof, thereby to help to achieve an efficient collection of express packages.

According to an aspect of the present invention, there is provided an express package collection locker capable of calculating the portage fees of packages, the locker comprising a plurality of boxes for storing packages, each having a door, a plurality of weight-measuring means incorporated within the boxes, respectively, for weighing the packages stored in the boxes, destination-input means for inputting data representing destinations of the packages stored in the boxes, portage-fee calculating means for calculating portage fees of each of the packages stored in the boxes, in accordance with the weight of the package measured by the weight-measuring means and the destination input by operating the destination-input means, display means for displaying the portage fee calculated by the portage-fee calculating means and instructions as to how to use the locker, detector means for detecting whether the portage fee has been paid into the locker, locking means for locking the door of the box when the detector means detects that the portage fee has been paid for the package stored in the box, and voucher-issuing means for printing and issuing a voucher when the detector means detects that the portage fee has been paid and the locking means has locked the door of the box.

According to an another aspect of the present invention, there is provided an express package collection locker capable of calculating the portage fees of packages, the locker comprising a plurality of boxes for storing packages, each having a door, a plurality of size-measuring means incorporated within the boxes, respectively, for measuring the sizes of the packages stored in the boxes, destination-input means for inputting data representing destinations of the packages stored in the boxes, portage-fee calculating means for calculating portags fees of each of the packages stored in the boxes, in accordance with the size of the package measured by the size-measuring means and the destination input by operating the destination-input means, display means for displaying the portage-fee calculated by the portage-fee calculating means and instructions as to how to use the locker, detector means for detecting whether the portage fee has been paid into the locker, locking means for locking the door of the box when the detector means detects that the portage has been paid for the package stored in the box, and voucher-issuing means for printing and issuing a voucher when the detector means detects that the portage fee has been paid and the locking means has locked the door of the box.

According to a further aspect of the present invention, there is provided an express package collection locker capable of calculating the portage fees of packages, to be installed against a building with its front facing outward and its rear exposed to said building, the locker comprising a box for storing a package, weight-measuring means incorporated within the box, for weighing the package placed in the box, destination-input means for inputting data representing the destination of the package placed in the box, portage-fee calculating means for calculating portages fees of the package placed in the box, in accordance with the weight of the package measured by the weight-measuring means and the destination input by operating the destination-input means, display means for displaying the portage fee calculated by the portage-fee calculating means and instructions as to how to use the locker, detector means for detecting whether the portage has been paid into the locker, package-moving means for moving the package inside of said bulding from the box, and voucher-issuing means for printing and issuing a voucher when the detector means detects that the portage fee has been paid into the locker.

DETAILED DESCRIPTION OF THE PREFERRED EMBODIMENTS

Figure 1:
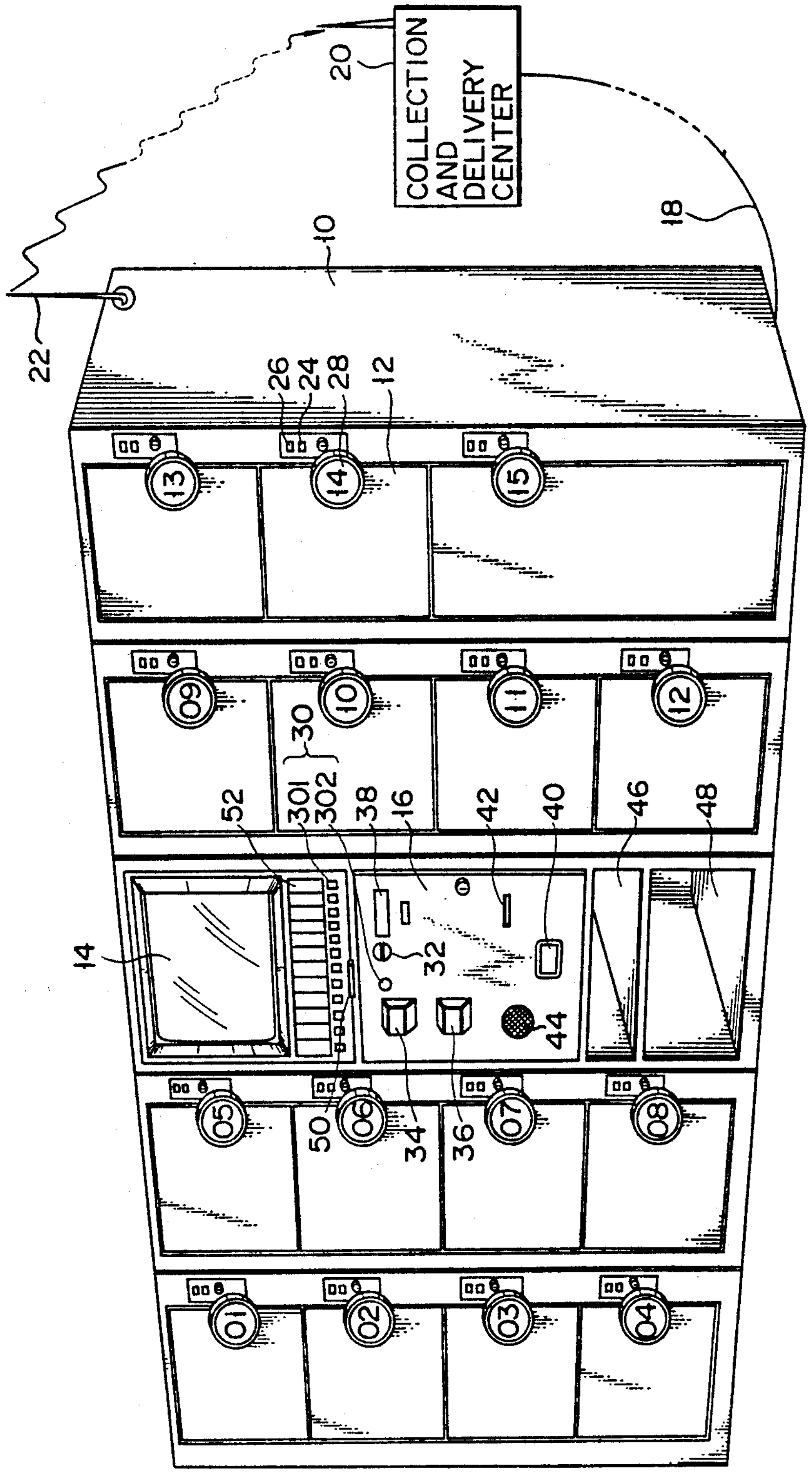
FIG. 1 is a perspective view showing the outer appearance of an express package collection locker according to the present invention.

FIG. 1 shows the outer appearance of express package collection locker 10 according to the present invention. This locker can automatically calculate the portage fees of the packages stored in it. Locker 10 comprises a plurality of boxes 12, 14-inch CRT display 14, and control device 16. Boxes 12 are divided into two groups. CRT display 14 and control device 16 are interposed between two groups of boxes 12, with CRT display 14 mounted on control device 16. Locker 10 further comprises optical-fiber cable 18 connected to collection and delivery center 20, and, if needed, antenna 22 for transmitting radio signals to center 20. Needless to say, locker 10 has a power-supply cable (not shown) connected to a power source (not shown, either).

Express package collection locker 10 is installed in a merchandise store which offers a package-collecting service. An ID number has been assigned to locker 10, so that locker 10 can be identified before necessary data is exchanged between it and collection and delivery center 20.

Figure 3:
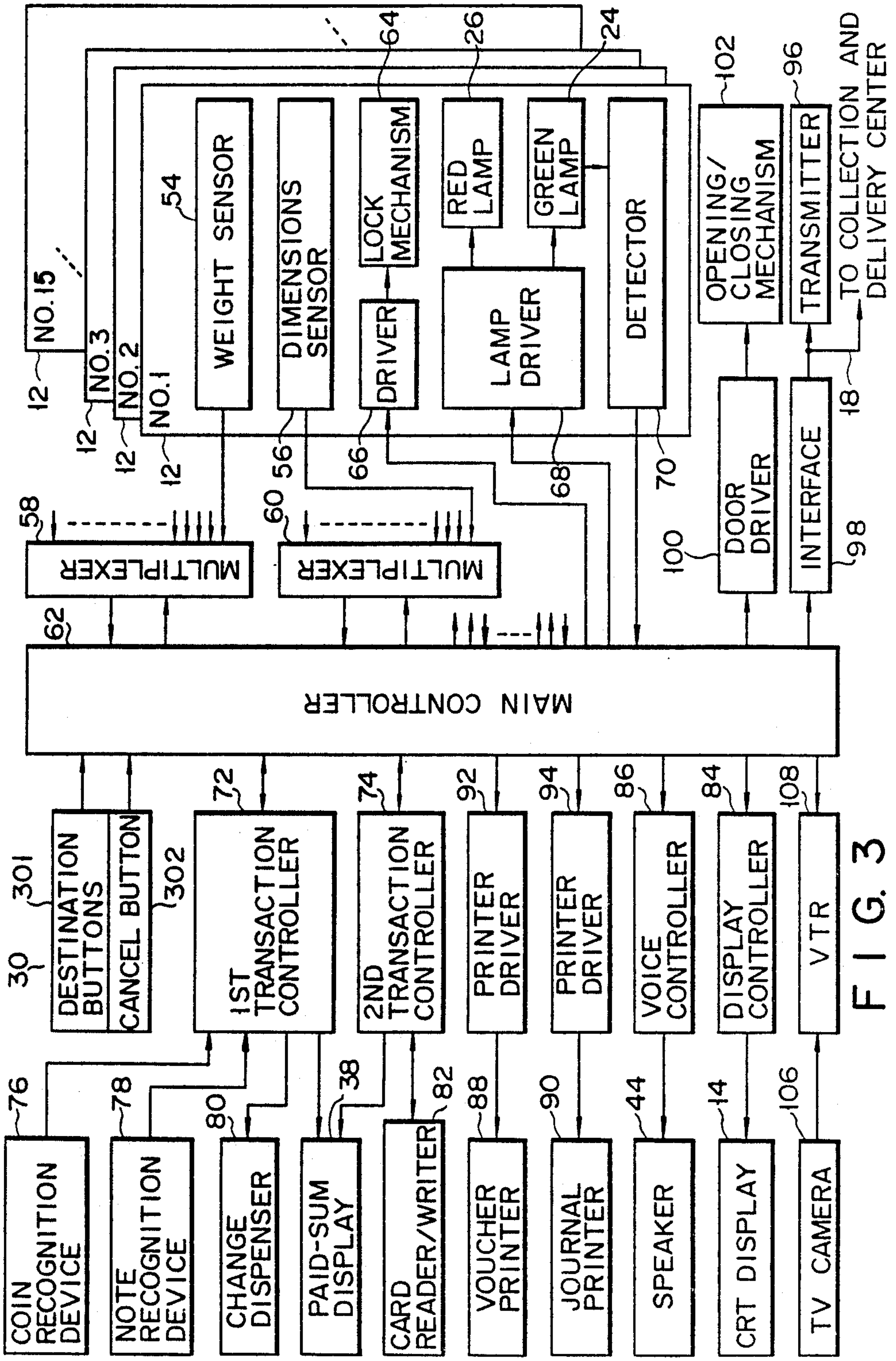
FIG. 3 is a block diagram showing the components of the locker shown in FIG. 1.
Figure 4A:
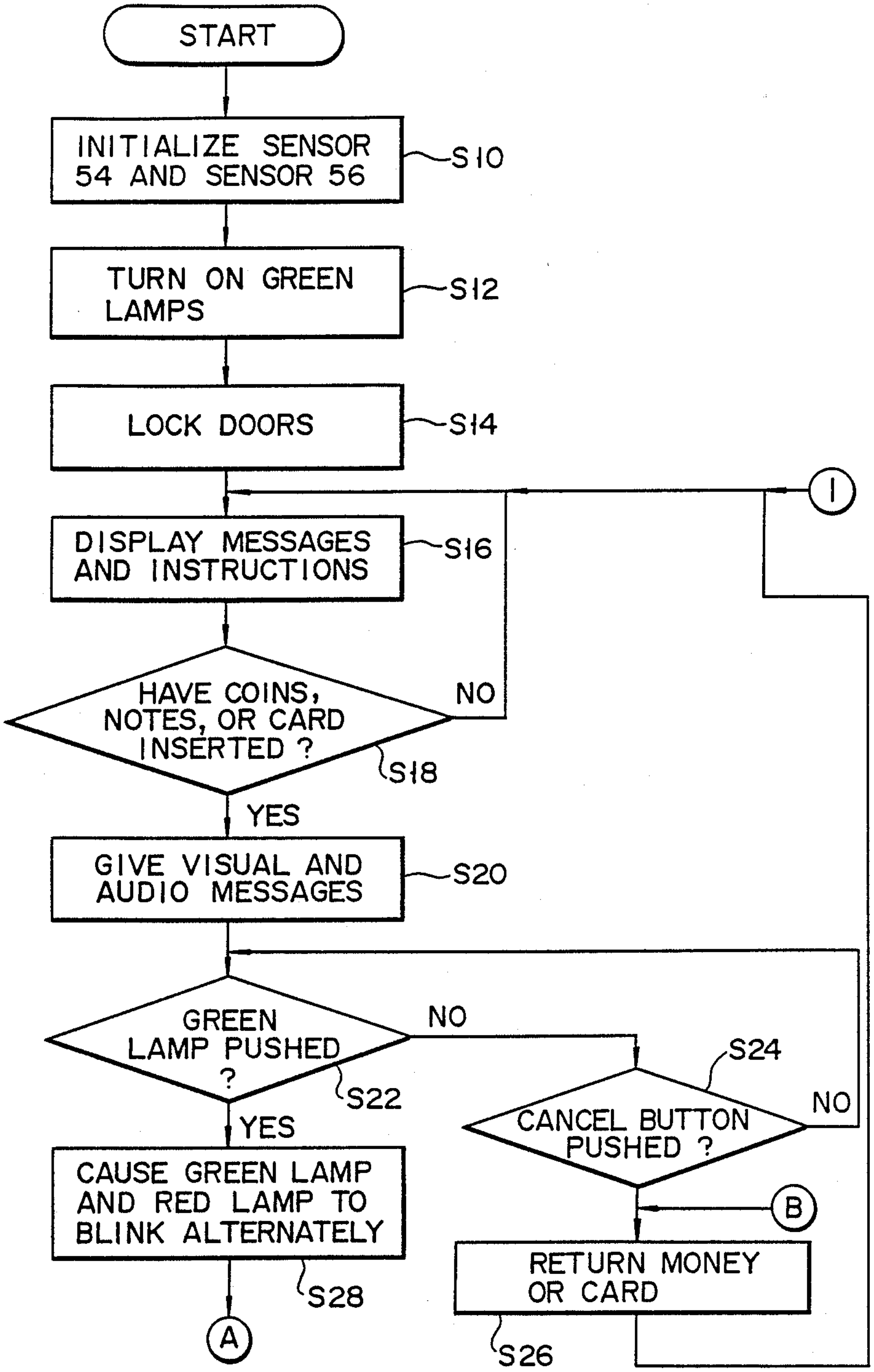
FIGS. 4A, 4B, 4C, 4D, and 4E are flow charts explaining the operation of the locker shown in FIG. 1.
Figure 4B:
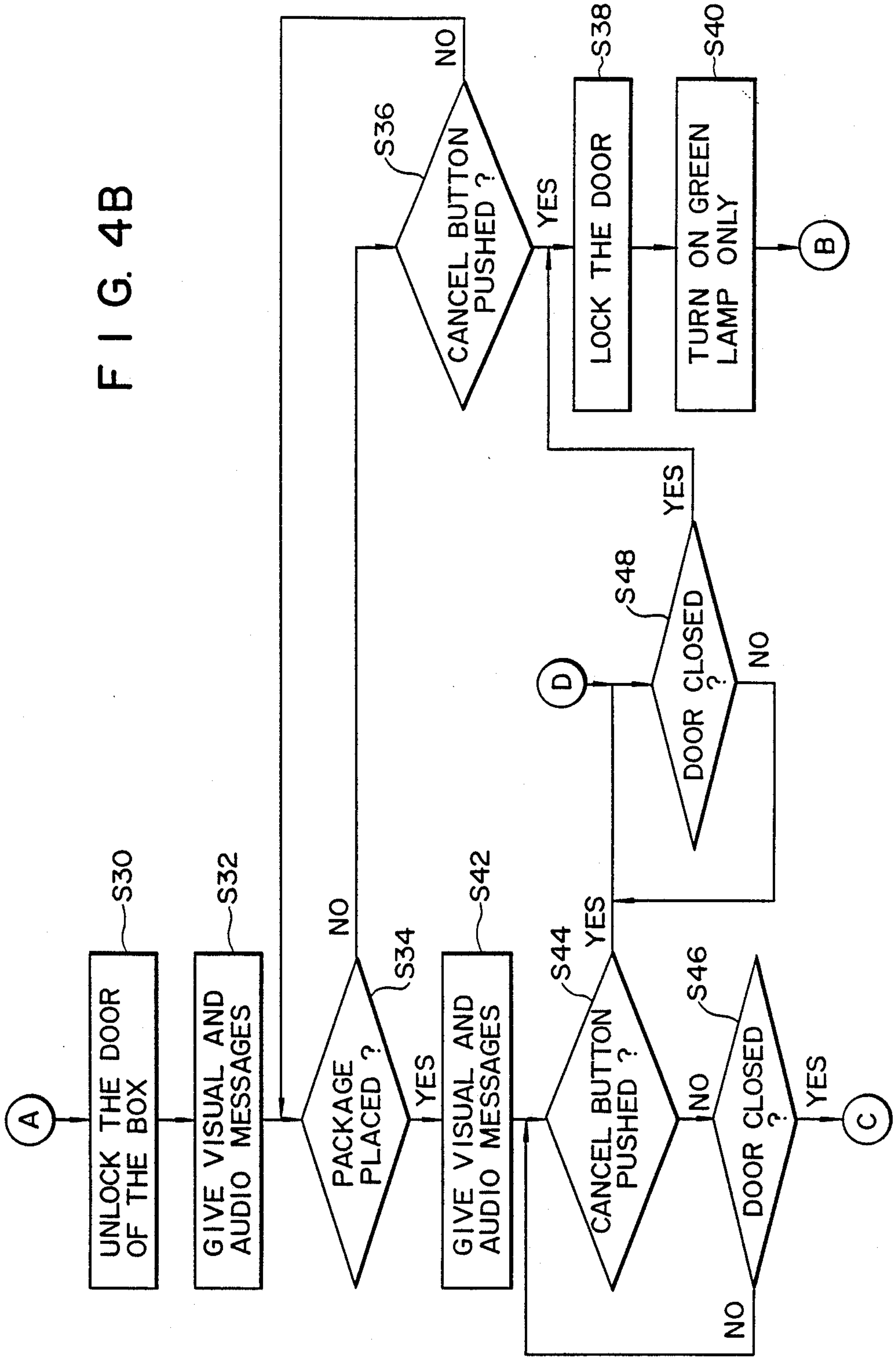
Figure 4C:
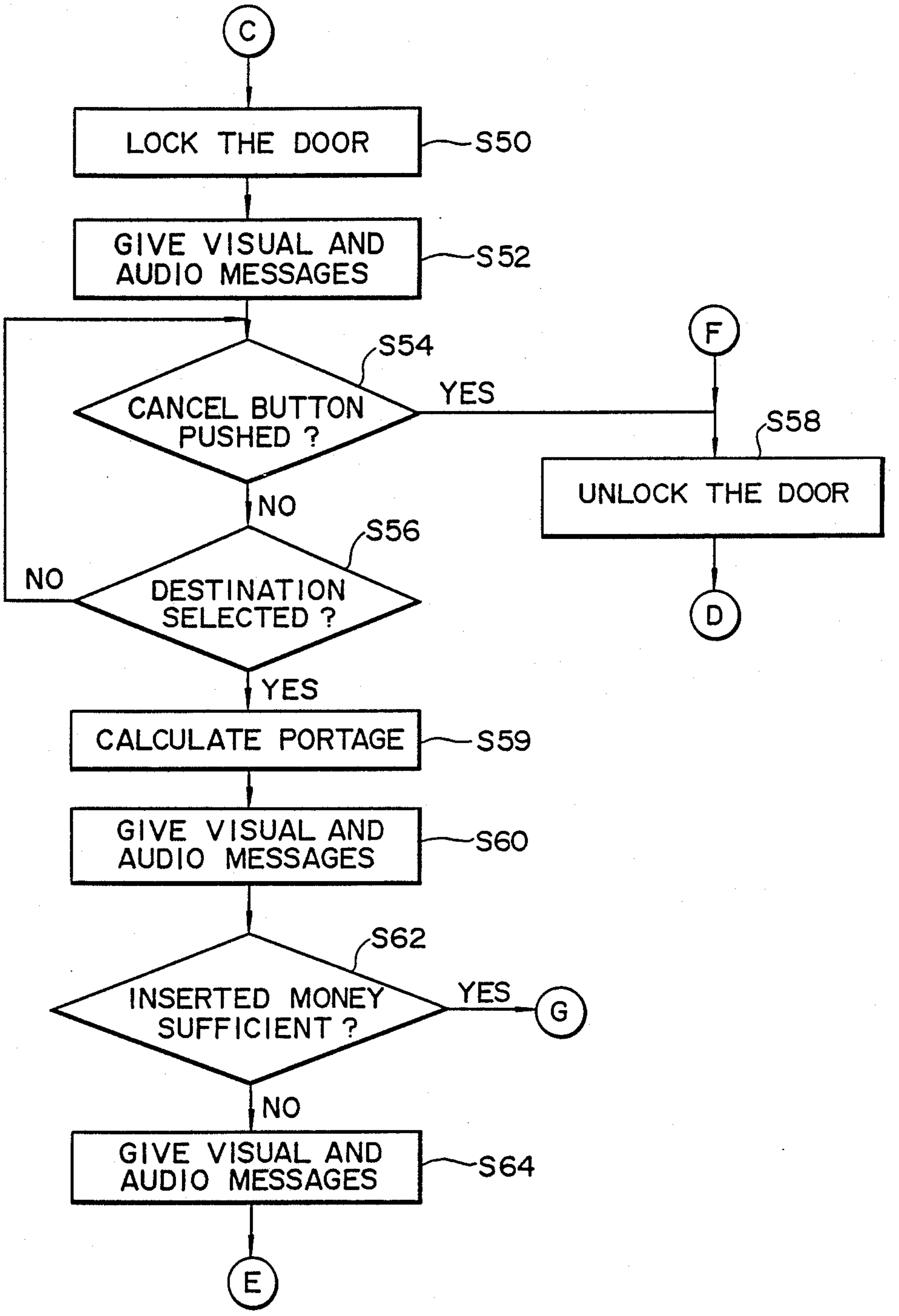
Figure 4D:
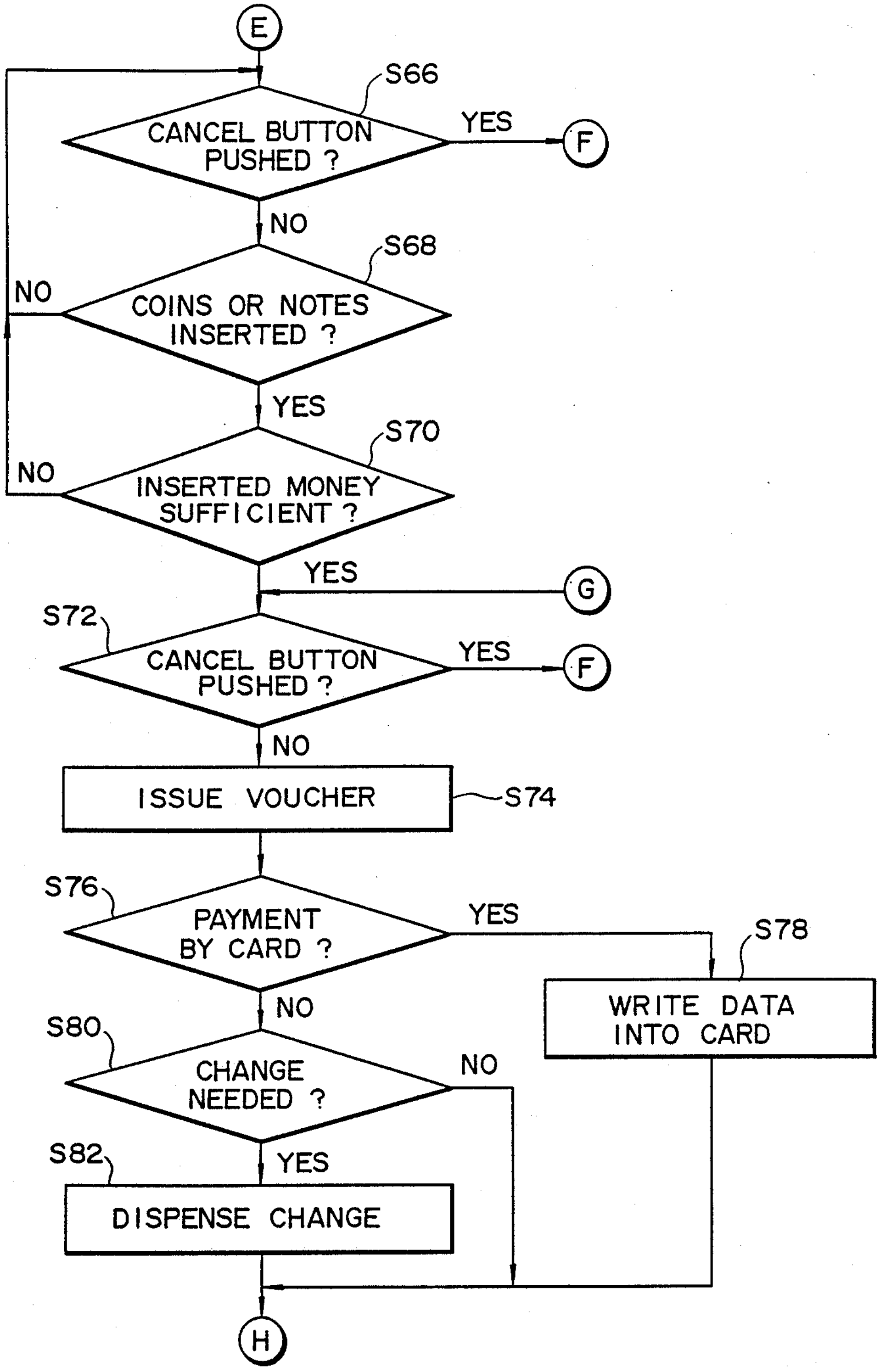
Figure 4E:
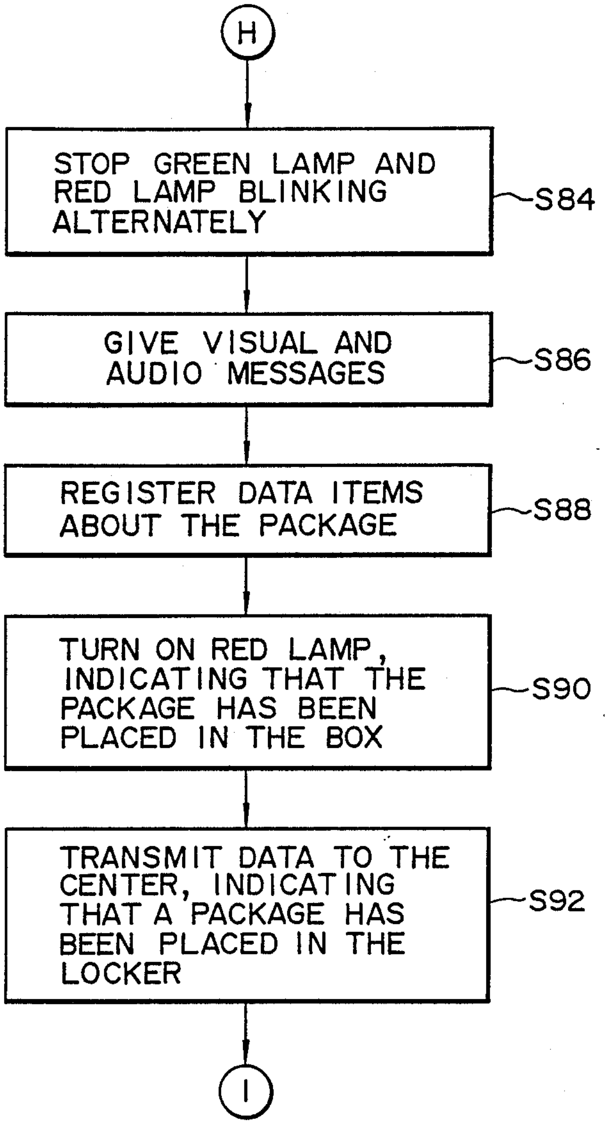

Each of boxes 12 has a door, a green lamp 24, a red lamp 26. Both lamps 24 and 26, which are, for example, light-emitting diodes, are located beside the door. When red lamp 26 emits light, it is thereby indicated that box 12 is filled, and when green lamp 24 emits light, it is thereby indicated that box 12 is empty. Green lamp 24 functions as a push button. A weight-measuring device, such as an electrostatic capacitance meter or a semiconductor weight sensor 54, shown schematically in FIG. 3, is incorporated inside each box 12 such as Box No. 1. If necessary, dimension sensors also shown schematically in FIG. 3,--. for detecting the dimensions (width, height, and depth), i.e. measuring the size of a package, can also be incorporated inside each box 12, so that the portage fee of the package can be calculated from the sensed dimensions alone. In this first embodiment, all boxes 12 are the same size and the portage fee is determined from the sizes of the packages placed therein.

A lock mechanism (not shown) is incorporated in each of boxes 12, for locking the door of the box. A handle 28 is attached to the door of each box 12. The ID number of the box is printed or painted on handle 28.

As is shown in FIG. 1, fourteen of the fifteen boxes of locker 10 have the same size. Nonetheless, the locker can have more or less boxes. Further, boxes 12 can have different sizes such as Box Nos. 14 and 15. If this is the case, different portage rates are set in accordance with the sizes of boxes 12; the larger the box, the higher the portage rate. Thus, in other words, in this second embodiment, all boxes 12 have different sizes and the portage fee is determined from the size of the box into which the package is placed. Therefore, it is important that small packages be placed only in small boxes. Necessarily, large packages can be placed only in large boxes because of the impossibility of their fitting into small boxes.

CRT display 14 is used for displaying operation instructions, the portage fee for the package to be sent, and other data items. Among the operation instructions is "Insert Money Equivalent to the Portage Fee." When nobody is operating control device 16 or carrying out any other actions to place his package in one of boxes 12, CRT display 14 continually displays a prescribed demonstration message.

Although not shown in FIG. 1, two output devices other than CRT display 14 are incorporated in express package collection locker 10. One of them is a voucher printer for printing a voucher (or a receipt) to be issued to the person who has placed his or her package in one of boxes 12 and paid the required portage fee. The other is a journal printer for printing the particulars of items within each package stored in collection locker 10.

Control device 16 includes console panel 30 which has destination buttons 301 and cancel button 302. Device 16 has coin slot 32, note-insertion slit 34, and card-insertion slit 36. If further has paid-sum display 38 for displaying the amount of money inserted into device 16, a change dispenser (not shown), and change pocket 40. Still further, control device 16 has voucher pocket 42 and speaker 44. The individual, who has placed a package on one of boxes 12 and has paid an amount of money greater than the portage fee, will receive the change from pocket 40. Any individual, who has placed a package on one of boxes 12 and duly paid the required portage fee, will receive the voucher from pocket 42. Speaker 44 outputs audio operating instructions. Although not shown in FIG. 1, a main controller And an interface device are incorporated in control device 16. The main controller comprises a microcomputer for calculating the portage fees of the packages and controlling the other components of locker 10. The interface device is used to transfer data from the main controller to collection and delivery center 20.

Label box 46 is located below control device 16 and contains a number of label forms which individuals, who wish to send packages, fill in and then paste into the packages. Baggage box 48 is located below label box 46, for temporarily storing a baggage while the owner of the baggage is operating control device 16, filling in the label form, and carrying out other activities things in accordance with the operation instructions given by CRT display 14 and speaker 44. Table 50, which can be pushed into, and pulled out of, control device 16, is located below destination buttons 301. This table 50 can be used when filling out the label forms.

As is shown in FIG. 1, console panel 30 has twelve destination buttons 301 which correspond to twelve destination regions within the United States, and one of the twelve destination regions can be selected for the package by pushing one of these twelve buttons 301. Needless to say, panel 30 can have less destination buttons, in which case larger regions, such as the South-East, the Middle, the North-West, etc., can be selected.

Figure 2:
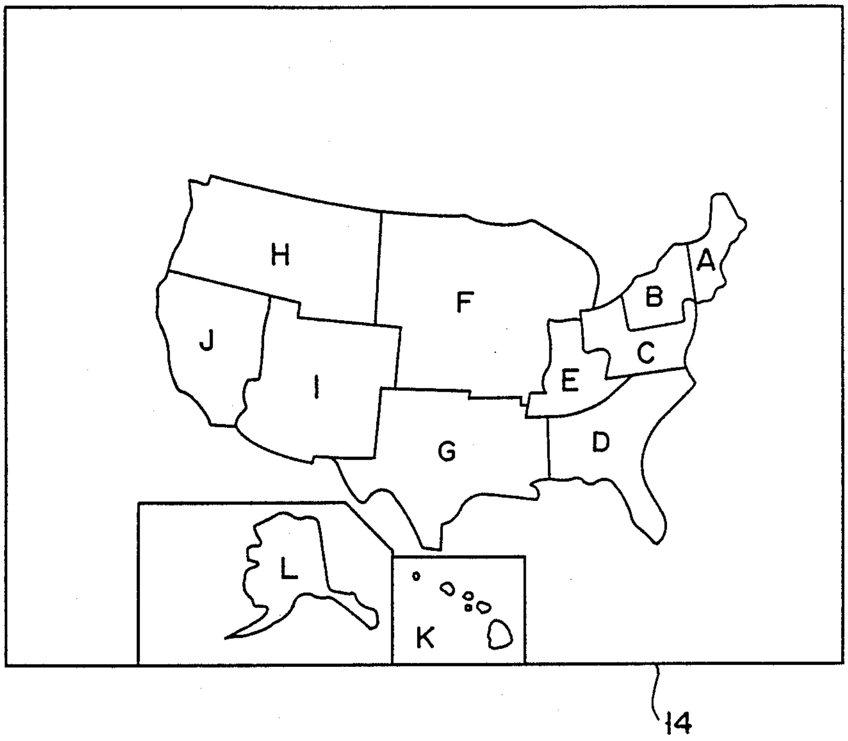
FIG. 2 is a diagram showing the U.S. map displayed on a CRT display, indicating the delivery districts.

Alternatively, panel 30 can have more destination buttons, and a destination which corresponds to one of the fifty-one States can be specified for the package. For example, as is shown in FIG. 2, CRT display 14 displays a map of the United States divided into twelve regions; A through K. Destination buttons 301 are labeled "A" to "K", respectively, and twelve plates 52 are attached to panel 30, right above buttons 301, respectively. Each plate 52 displays the States contained with in the regions which are to be selected from buttons 301 right below the plate. Therefore, a package sender can refer to both the map displayed by CRT display 14 and plates 52, when selecting and pushing one of buttons 301 to designate the destination of his/her express package. According to the present invention, destination buttons 301 can be replaced by a touch-screen showing a map of the United States, in which case the package sender can designate the destination of the package, by merely touching the portion of the screen which corresponds to the destination.

FIG. 3 is a block diagram showing the components of express package collection locker 10. The pulse signals output by weight sensor 54 and dimensions sensor 56, both arranged within each box 12, are supplied to multiplexers 58 and 60, respectively. The pulse signal output by weight sensor 54 has a peak value corresponding to the weight of the package placed in box 12. The pulse signal output by dimensions sensor 56 has a peak value corresponding to the size of the package. Main controller 62 supplies a selection signal to multiplexers 58 and 60. In response to the selection signal, multiplexers 58 and 60 sample the pulse signals supplied from sensors 54 and 56, respectively, and output data items representing the weight and size of the package. These data items are input to main controller 62.

Driver 66, lamp driver 68, and detector 70 are incorporated in each of boxes 12. Driver 66 is designed to drive lock mechanism 64 which is also provided within the box for locking the door of box 12. Lamp driver 68 causes green lamp 24 and red lamp 26 to blink. Detector 70 detects whether green lamp 24, which functions as a push button, is depressed. Driver 66, lamp driver 68, and detector 70 are connected to main controller 62. Console panel 30, which has destination buttons 301 and cancel button 302, is also coupled to main controller 62. Main controller 62 has a memory storing the different portage rates for the destination regions.

Two transaction controllers 72 and 74 are connected to main controller 62. Coin recognition device 76 and note recognition device 78 are connected to first transaction controller 72. Coin recognition device 76 can recognize the denomination of any coin inserted into control device 16 through coin slot 32. Note recognition device 78 can recognize the denomination of any note inserted into control device 16 through note-insertion slit 34. Hence, devices 76 and 78 are coordinated to determine the amount of money inserted into control device 16. Paid-sum display 38 displays the amount determined by devices 76 and 78. Display 38 has, for example, a plurality of 7-segment lamps. Change dispenser 80 is connected to first transaction controller 72. Change dispenser 80 is designed to dispense change to change pocket 42 and to return the inserted money to pocket 40 when cancel button 302 is pushed.

Card reader/writer 82 and paid-sum display 38 are coupled to second transaction controller 74. Card reader/writer 82 is used to read the recorded data balance of a prepaid card inserted in card-insertion slit 36. The balance thus read from the prepaid card is displayed by paid-sum display 38.

Display controller 84, voice controller 86, printer drivers 92 and 94, and interface 98 are connected to main controller 62. Display controller 84 is used to control CRT display 14. Voice controller 86 is provided for controlling speaker 44. Printer driver 92 drives voucher printer 88, and printer driver 94 drives journal printer 90. Interface 98 is coupled to optical-fiber cable 18 and transmitter 96, so that the data items representing various facts, e.g., the placing of a package in one of boxes 12, are supplied from main controller 62 to collection and delivery center 20 via cable 18 or transmitter 96. A response device (not shown), which is used is responding to a telephone inquiry made from center 20 concerning whether or not packages have been placed in locker 10, can be connected to main controller 62.

FIG. 4A through FIG. 4E are flow charts explaining the operation of express package collection locker 10 which has been described above. The operation of locker 10 will now be described with reference to these flow charts.

When the power-supply switch (not shown) of locker 10 is turned on, weight sensor 54 and dimensions sensor 56 are initialized in step S10. In step S12, main controller 62 causes lamp drivers 68, which are incorporated in boxes 12, to turn off red lamps 26 and turn on green lamps 24. Then, in step S14, main controller 62 gives a locking instruction to drivers 66 incorporated in boxes 12. In accordance with this instruction, drivers 66 drives lock mechanisms 64, whereby mechanisms 64 lock the doors of boxes 12.

Thereafter, main controller 62 gives a demonstration message-display instruction to display controller 84. In response to this instruction, controller 84 causes CRT display 14 to display the prescribed demonstration message and then the operation instructions, in step S16. In the next step S18, main controller 62 determines if coins, notes, or a prepaid card has been inserted into control device 16. Until either coins, notes, or a prepaid card is inserted, and first transaction controller 72 or second transaction controller 74 supplies a signal, which shows that coins, notes, or a card has been inserted, to main controller 62, main controller 86 makes display controller 84 cause CRT display 14 to display the demonstration message and the operation instructions, alternatively.

Figure 5:
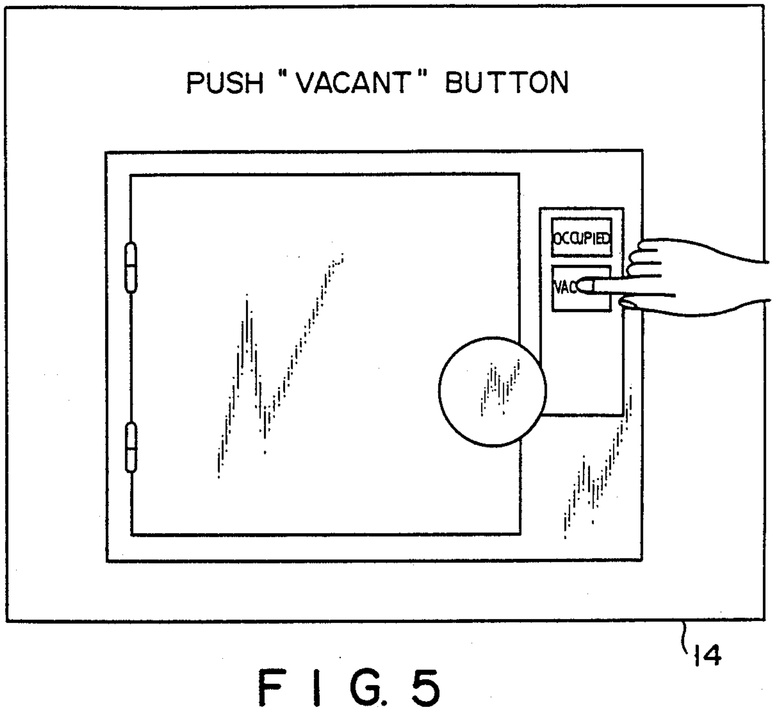
FIGS. 5, 6, 7 and 8 are diagrams showing the operation instructions displayed by the CRT display.

Upon receipt of the signal from first transaction controller 72 or second transaction controller 74, main controller 62 gives a first message-giving instruction to display controller 84 and voice controller 86, in step S20. In accordance with this instruction, display controller 84 causes CRT display 14 to display the message "Welcone" Simultaneously, in accordance with the same instruction, voice controller 86 causes speaker 44 to give forth the audio message "Welcome" Then, display controller 84 causes CRT display 14 to display the message "Push 'vacant' button," as is shown in FIG. 5, and voice controller 86 causes speaker 44 to give the audio message "Push 'vacant' button." In the next step, S22, main controller 62 determines whether or not any detector 70 has detected the depression of green lamp 24. If NO in step S22, main controller 62 determines whether or not cancel button 302 has been depressed, in step S24. If YES in step S24, main controller 62 gives a refund instruction, transaction controller 72 causes change dispenser 80 to dispense the coins and/or notes to change pocket 40. Similarly, in accordance with the refund instruction, transaction controller 74 causes card reader/writer 82 to return the prepaid card to card-insertion slit 36. Thereafter, the operation returns to step S16, whereby CRT display 14 displays the demonstration message and the operation instructions, alternately.

Figure 6:
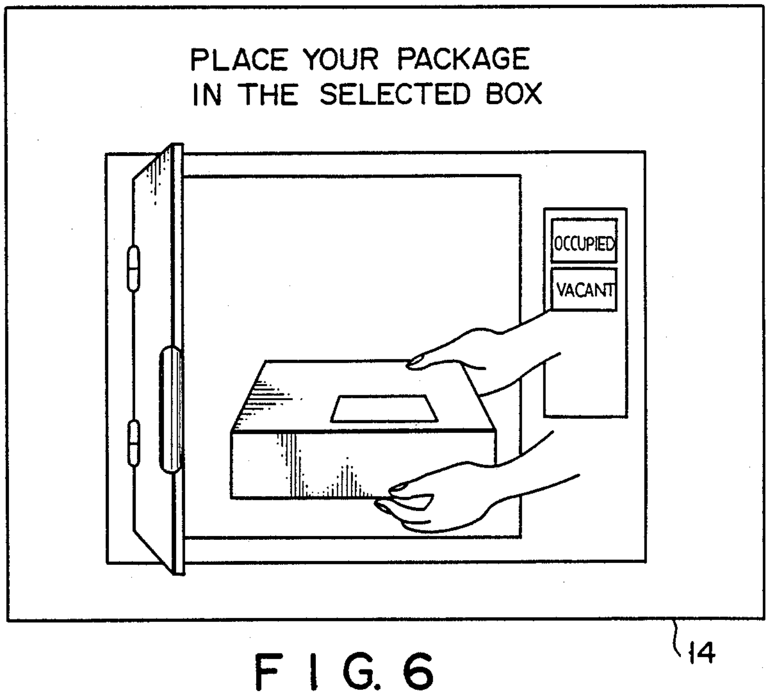

If YES in step S22, that is, if main controller 62 receives the output signal of detector 70 incorporated in any box 12, main controller 62 gives an instruction to lamp driver 68 of this box, whereby driver 68 causes green lamp 24 and red lamp 26 to blink alternatively, in step S28. In the next step S30, main controller 62 gives a lock-release instruction to the driver 66 of box 12. In response to this instruction, driver 66 stops driving lock mechanism 64, thus unlocking the door of box 12. Then, in step S32, main controller 62 gives a second message-giving instruction to display controller 84 and voice controller 86. In response to this instruction, display controller 84 makes CRT display 14 display the message "Place your package in the selected box," as is shown in FIG. 6, and simultaneously, voice controller 86 causes speaker 44 to give forth the audio message "Place your package in the selected box."

In the next step, S34, main controller 62 determines whether or not the package sender has opened the door of box 12 and placed his or her package in this box 12. If NO in step S34, main controller 62 determines, in step S36, whether or not cancel button 302 has been pushed. More specifically, when the package is placed in box 12, weight sensor 54 and dimensions sensor 56, both incorporated within this box, detect the presence of the package, whereby multiplexers 58 and 60 supply pulse signals to main controller 62. If this is the case, the operation goes to step S42. If neither multiplexer supplies a pulse signal to main controller 62, the operation proceeds to step S36.

If YES in step S36, that is, if cancel button 302 has been depressed, main controller 62 gives a door-lock instruction to driver 66, whereby driver 66 causes lock mechanism 64 to lock the door of box 12, in step S38. Then, in step S40, main controller 62 gives an instruction to lamp driver 68. In response to this instruction, lamp driver 68 causes green lamp 24 and red lamp 26 to stop blinking alternately, and only turns on green lamp 24. Thereafter, the operation returns to step S26, whereby change dispenser 80 dispenses the money to change pocket 40, or card reader/writer 82 returns the prepaid card to card-insertion slit 36.

If YES in step S34, that is, if the package has been placed in box 12 and multiplexers 58 and 60 have supplied pulse signals to main controller 62, controller 62 gives a third message-giving instruction to display controller 84 and voice controller 86, in step S42. In response to this instruction, display controller 84 makes CRT display 14 display the message "Close the door," and voice controller 86 causes speaker 44 to output the audio message "Close the door." In the next step S44, main controller 62 determines whether or not cancel button 302 has been pushed. If NO, then main controller 62 determines, in step S46, whether or not the door of box 12 has been closed. If YES, that is, if cancel button 302 has been pushed, main controller 62 determines, in step S48, whether or not the door has been closed. If YES in step S48, main controller 62 makes driver 66 cause lock mechanism 64 to lock the door in step S38.

Figure 7:
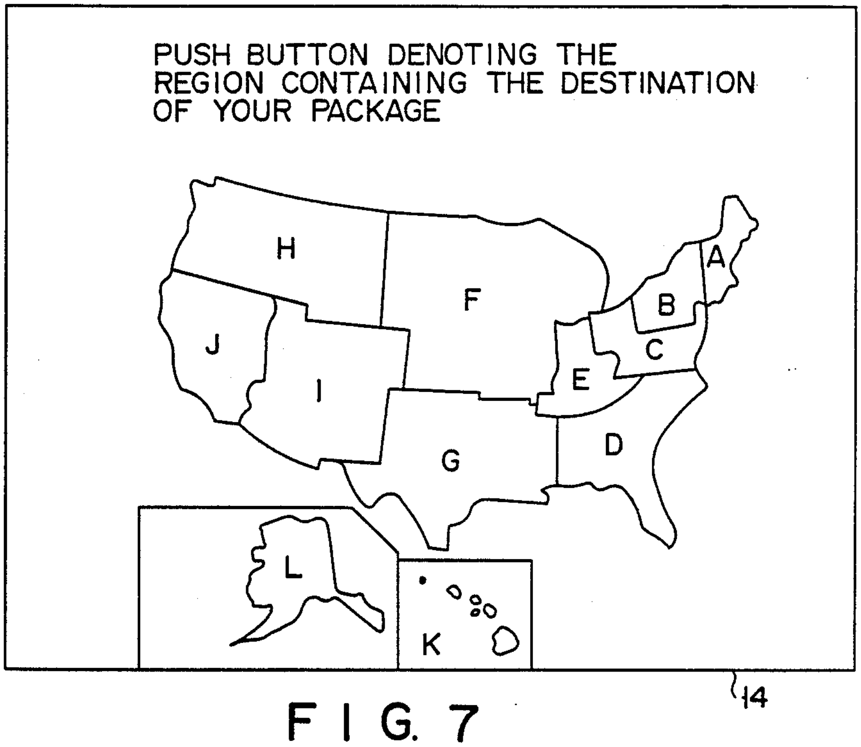

If YES in step S46, that is, if the door sensor (not shown) provided at box 12 for detecting whether the door is in the closed position, has supplied an output signal to main controller 62, main controller 62 gives a door-lock instruction to driver 66 upon the lapse of a predetermined time period, e.g., three seconds, after the receipt of the signal from the door sensor. In response to this door-lock instruction, driver 66 drives lock mechanism 64, which then locks the door of box 12, in step S50. Thereafter, main controller 62 gives a fourth message-giving instruction to display controller 84 and voice controller 86. In response to this instruction, display controller 84 causes CRT display 14 to display the message "Push button denoting the region containing the destination of your package", as is shown in FIG. 7, and simultaneously, voice controller 86 is caused to give forth the audio message "Push button denoting the region containing the destination of your package", in step S52. Then, in step S54, main controller 62 determines whether or not cancel button 302 has been pushed. If NO, then controller 62 determines whether or not any one of the destination buttons 301 has been pushed, thus selecting one of the regions. If YES in step S54, that is, cancel button 302 has been pushed, main controller 62 gives a lock-release instruction to driver 66. In response to the lock-release instruction, driver 66 causes lock mechanism 64 to unlock the door of box 12, in step S58. Then, the operation returns to step S48, in which main controller 62 determines whether or not the door has been closed after the removal of the package from box 12.

Figure 8:
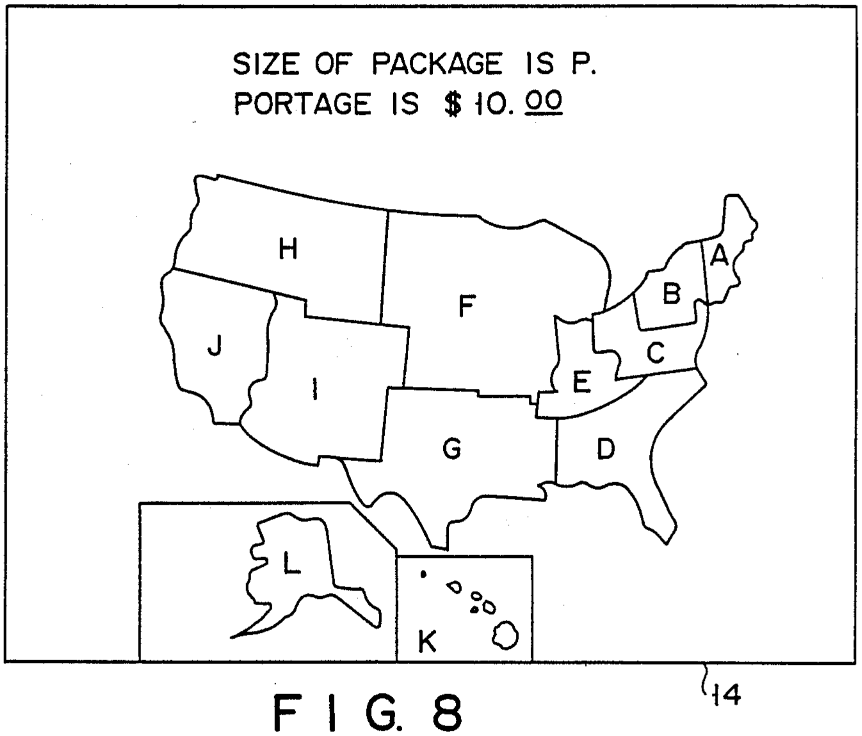

If YES in step S56, that is, if any one of the destination buttons 301 has been pushed, main controller 62 calculates the portage fee of the package placed in box 12, from the rate fixed for the selected region (i.e., the data item stored in the memory and representing this rate), the pulse signal output by multiplexer 58 and representing the weight of the package, and the pulse signal output by multiplexer 60 and representing the size of the package. This calculation is performed in step S59. In the next step, S60, main controller 62 gives a fifth message-giving instruction to display controller 84 and voice controller 86, and also supplies the data items representative of the size of the package and the portage fee calculated in step S69. In response to the fifth message-giving instruction, display controller 84 causes CRT display 14 to display the messages "Size of package is P" and "Portage is \$10$^{00}$," as is illustrated in FIG. 8, and simultaneously voice controller 86 causes speaker 44 to output an audio message which is identical to the visual message given by CRT display 14.

Thereafter, in step S62, main controller 62 determines, from the data supplied from first transaction controller 72 or second transaction controller 74, whether or not the money inserted into control device 16, or the balance recorded on the prepaid card inserted into device 16 is equal to or greater than the required portage fee. if NO, controller 62 gives a sixth message-giving instruction to display controller 84 and voice controller 86, in step S64. In response to this instruction, display controller 84 causes CRT display 14 to display the message "Insert more money", and voice controller 86 causes speaker 44 to give forth the audio message "Insert more money".

Then, the operation goes to step S66, in which main controller 62 determines whether or not cancel button 302 has been pushed. If NO in step S66, the controller 62 determines, in the next step S68, whether or not additional money has been inserted into control device 16. If YES in step S66, the operation returns to step S58, whereby main controller 62 gives a lock-release instruction to driver 66, and lock mechanism 64 unlocks the door of box 12.

If YES in step S68, that is, if additional money has been inserted into control device 16, main controller 62 determines, in step S70, whether or not the sum of this additional money and the previously inserted money, or the sum of this additional money and the balance recorded in the prepaid card is equal to or greater than the portage calculated in step S59. If NO in step S70, the operation returns to step S66. In the meantime, paid-sum display 38 displays the sum of the additional money and the previously inserted money or the sum of the additional money and the balance recorded in the card. At this time, green lamp 24 and red lamp 26 are still blinking alternately.

If YES in step S70, that is, if the sum is equal to or greater than the portage, main controller 62 determines, in step S72, whether or not cancel button 302 has been pushed. If YES, the operation returns to step S58, whereby controller 62 gives a lock-release instruction to driver 66, and lock mechanism 64 therefore unlocks the door of box 12. If NO in step S72, main controller 62 gives a print instruction to printer driver 92 and supplies necessary data thereto. Printer driver 92 causes voucher printer 88 to print the data on a length of paper tape fed from a roll, and a cutter (not shown) cuts the printed voucher from the paper tape. The voucher is supplied to voucher pocket 42. The issuing of the voucher is performed in step S74. In the next step, S76, controller 62 determines whether or not the prepaid card has been inserted into control device 16. In other words, it is determined whether or not the package sender wants to pay the portage by using the prepaid card. If YES, main controller 62 supplies the data, which represents the portage, to second transaction controller 74. In step S78, second transaction controller 74 causes card reader/writer 82 to write this data in the prepaid card. The card is then returned to card-insertion slit 36.

If NO in step S76, that is, if the package sender wants to pay the portage in cash, the main controller 62 determines, in step S80, whether or not changes must be given. More precisely, controller 62 compares the amount of the money inserted into control device 16 with the portage calculated in step S59. If YES, main controller 62 supplies the data representing the amount of the change, to first transaction controller 72, in step S82. Also in step S82, first transaction controller 72 controls change dispenser 82, whereby the change is dispensed to change pocket 40.

Thereafter, in step S84, main controller 62 causes lamp driver 68 to stop green lamp 24 and red lamp 26 blinking alternately. Then, in step S86, main controller 62 gives a seventh message-giving instruction to display controller 84 and voice controller 86. In response to this instruction, display controller 84 makes CRT display 14 display "Receive voucher," and voice controller 86 causes speaker 44 to give the audio message "Receive voucher." Further, display controller 84 causes CRT display 14 to display the message "Thank you," and similarly, voice controller 86 causes speaker 44 to give forth the audio message "Thank you."

Then, the operation goes to step S88, in which main controller 62 supplies the data about the package placed in box 12, to printer driver 94. Upon receipt of this data, printer driver 94 drives journal printer 90, whereby printer 90 prints the data on journal paper. In the next step, S90, main controller 62 gives a lamp-drive instruction to lamp driver 68. In response to the lamp-drive instruction, lamp driver 68 turns on red lamp 26 only, thus indicating that the package has been placed in box 12 selected by the package sender, and that this box is occupied.

At last, in step S92, main controller 62 supplies the data representing that the package has been placed in locker 10, to package collection and delivery center 20 through interface 98 and optical-fiber cable 18 or transmitter 96.

The package thus placed in any box 12 is collected by a delivery man, who unlocks the door of the box with the master key, opens the door, takes the package out, closes the door, and locks the door. When the package is taken out of box 12, red lamp 26 is automatically turned off, and green lamp 24 is automatically turned on, thus indicating that the box is vacant.

Figure 9B:
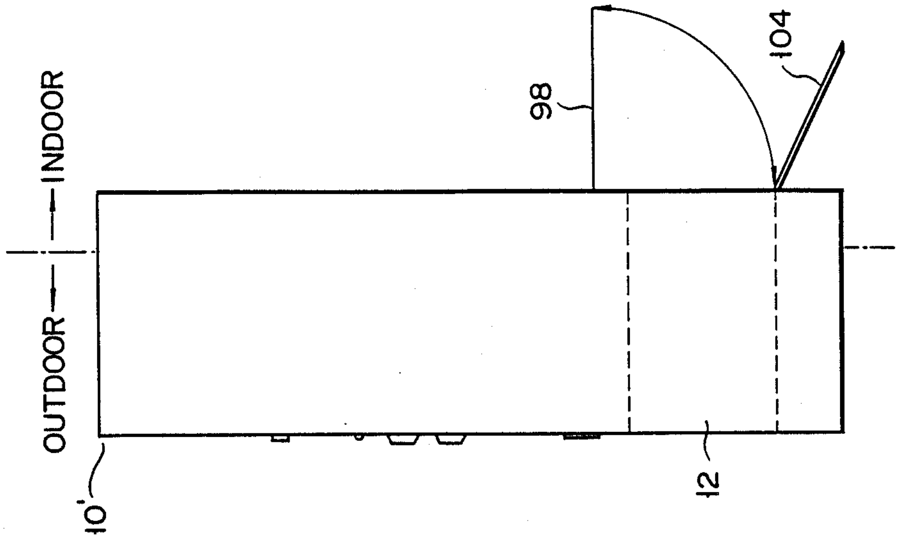
FIGS. 9A and 9B are a perspective view and a side view of an express package collection locker according to another embodiment of the present invention.
Figure 9A:
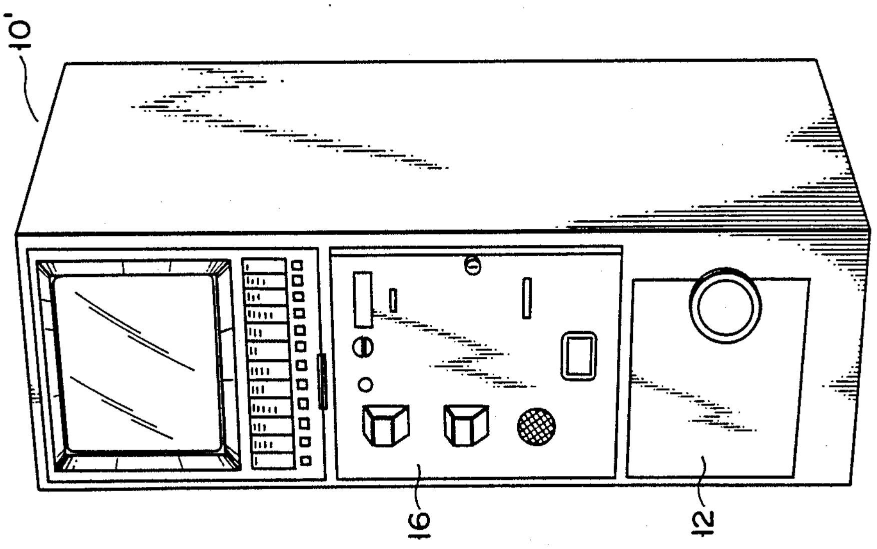

The present invention is not limited to the embodiment described above. It can be applied to the embodiment shown in FIGS. 9A and 9B. As is illustrated in these figures, this express package collection locker 10' has only one box 12 located below control device 16, unlike locker 10 shown in FIG. 1. Box 12 has a front door and a back door. The front door is of the same type as those of boxes 12 used in the first embodiment (FIG. 1). As is shown in FIG. 9B, back door 98 can be opened if the portage is paid. Locker 10' is installed at, for example, a merchandise store, with CRT display 14 and control device 16 exposed outdoors as is shown in FIG. 9B. When the portage for the package placed in box 12 is paid, main controller 62 gives a lock release instruction to door driver 100 (FIG. 3). In response to this instruction, door driver 100 drives opening/closing mechanism 102 (FIG. 3), whereby back door 98 is opened. Then, main controller 62 causes display controller 84 and voice controller 86, such that CRT display 14 and speaker 44 gives the visual and audio messages "Push your package." In accordance with this message, the package sender pushes the package placed in box 12. As a result, the package slides down slope 104 located inside the merchandize store.

As is shown in FIG. 3, TV camera 106 and videotape recorder (VTR) 108 can be installed, thus photographing every person who operates console panel 30 of control device 16 The recorded videotape can help the police to investigate the clime related to the package collected through this express package collection locker 10.

Needless to say, the locker according to the invention can be used for collecting various packages other than express packages.

As has been described above, the package collection locker according to the present invention can automatically calculate the portage for any package placed in it, to the minute degree, without causing the package sender any trouble. Since no human labor is required to operate the locker, the portage can be reduced if this locker is employed. Further, since the locker can serve every data, 24 hours a day, people can place their packages in the locker whenever they want to. Still further, since the data about any package placed in the locker is automatically transferred to the package collection and delivery center, the delivery company can perform an efficient collection and delivery operation. Moreover, the packages collected in the collection and delivery center can be automatically stored and distributed by means of a computer system in accordance with the data items about the packages, which have been transferred to the center from the lockers.

What is claimed is:

1. An express package collection locker capable of calculating the portage fees of packages, said locker comprising:

a plurality of boxes for storing packages, each having a door;

a plurality of weight-measuring means incorporated within said boxes, respectively, for weighing the packages stored in said boxes;

destination-input means for inputting data representing destinations of the packages stored in said boxes;

portage-fee calculating means for calculating portage fees of each of the packages stored in said boxes, in accordance with the weight of the package measured by said weight-measuring means and the destination input represented by operating said destination-input means;

display means for displaying the portage fee calculated by said portage-fee calculating means and instructions as to how to use the locker;

detector means for detecting whether the portage fee has been paid into the locker;

locking means for locking the door of the box when said detector means detects that the portage fee has been paid for the package stored in the box; and voucher-issuing means for printing and issuing a voucher when said detector means detects that the portage fee has been paid and said locking means has locked the door of the box.

2. The locker according to claim 1, further comprising means for printing, on a recording sheet, information about data items of the package stored in any one of said boxes, thereby recording the data items.

3. The locker according to claim 1, further comprising data-transferring means for transferring data representing that a package has been placed in any one of said boxes, to a package collection and delivery center.

4. The locker according to claim 3, wherein said data-transferring means includes a transmitter for transmitting said data to said package collection and delivery center.

5. The locker according to claim 1, further comprising:

a plurality of measuring means, incorporated in said boxes, respectively, for sensing dimensional sizes of packages placed in said boxes; and wherein said portage-fee calculating means calculates the portage fees of each of the packages, in accordance with the weight of the package measured by said weight-measuring means, the dimensional sizes of the package sensed by said size-measuring means, and the destination input represented by operating said destination-input means.

6. The locker according to claim 1, wherein said boxes have different sizes, and said portage-fee calculating means calculates the portage fee of the package placed in any one of said boxes, in accordance with the weight of the package measured by said weight-measuring means, the destination input represented by operating said destination-input means, and the size of the box.

7. The locker according to claim 1, further comprising a plurality of lamp means provided for said boxes, respectively, for indicating whether or not packages have been placed in said boxes.

8. The locker according to claim 7, wherein each of said lamp means comprises a green light-emitting diode for indicating that said box is empty, and a red light-emitting diode for indicating that the box is filled.

9. The locker according to claim 1, wherein said display means displays a map containing regions representing possible destinations of the packages.

10. The locker according to claim 9, wherein said destination-input means includes selection buttons for selecting the regions, displayed by said display means, which correspond to the destinations of packages.

11. An express package collection locker capable of calculating the portage fees of packages, said locker comprising:

a plurality of boxes for storing packages, each having a door;

a plurality of size-measuring means incorporated within said boxes, respectively, for measuring the sizes of the packages stored in said boxes;

destination-input means for inputting data representing destinations of the packages stored in said boxes;

portage-fee calculating means for calculating portage fees of each of the packages stored in said boxes, in accordance with the size of the package measured by said size-measuring means and the destination input by operating said destination-input means;

display means for displaying the portage-fee calculated by said portage-fee calculating means and instructions as to how to use the locker;

detector means for detecting whether the portage fee has been paid into the locker;

locking means for locking the door of the box when said detector means detects that the portage has been paid for the package stored in the box; and voucher-issuing means for printing and issuing a voucher when said detector means detects that the portage fee has been paid and said locking means has locked the door of the box.

12. The locker according to claim 11, further comprising means for printing, on a recording sheet, information about data items of the package placed in any one of said boxes, thereby to record the data items.

13. The locker according to claim 11, further comprising data-transferring means for transferring data representing that a package has been placed in any one of said boxes, to a package collection and delivery center.

14. The locker according to claim 13, wherein said data-transferring means includes a transmitter for transmitting said data to said package collection and delivery center.

15. The locker according to claim 11, further comprising a plurality of lamp means provided for said boxes, respectively, for indicating whether or not packages have been placed in said boxes.

16. The locker according to claim 15, wherein each of said lamp means comprises a green light-emitting diode for indicating that said box is empty, and a red light-emitting diode for indicating that the box is filled.

17. The locker according to claim 11, wherein said display means displays a map containing regions representing possible destinations of packages.

18. The locker according to claim 17, wherein said destination-input means includes selection buttons for selecting the regions, displayed by said display means, which correspond to the destination of packages.

19. An express package collection locker capable of calculating the portage fees of packages, to be installed against a building with its front facing outward and its rear exposed to said building, said locker comprising:

a box for storing a package;

weight-measuring means incorporated within said box, for weighing the package placed in said box;

destination-input means for inputting data representing the destination of the package placed in said box;

portage-fee calculating means for calculating portage fees of the package placed in said box, in accordance with the weight of the package measured by said weight-measuring means and the destination input by operating said destination-input means;

display means for displaying the portage fee calculated by said portage-fee calculating means and instructions as to how to use the locker;

detector means for detecting whether the portage has been paid into the locker;

package-moving means for moving the package inside of said building from said box; and voucher-issuing means for printing and issuing a voucher when said detector means detects that the portage fee has been paid into the locker.

20. The locker according to claim 19, wherein said package-moving means comprises:

a rear door attached to the back of said box;

door-driving means for opening said rear door when said detector means detects that the portage fee has been paid into the locker, and for closing said rear door when said box is vacant; and a slope for guiding a package from said box when the package is moved inside of said building.

* * * * *

UNITED STATES PATENT AND TRADEMARK OFFICE
CERTIFICATE OF CORRECTION

PATENT NO. : 4,836,352

DATED : June 6, 1989

INVENTOR(S) : Kunio Tateno et al.

It is certified that error appears in the above-identified patent and that said Letters Patent is hereby corrected as shown below:

Cover page, right col., line 3, change "Staly" to --Stacy--

Abstract, line 1, after "locker" insert --is--.

Col. 1, line 18, change "offers" to --offer--
line 31, change "human." to --humans.--
line 37, change "delivery-collect" to --delivery collection--
line 53, after "serve" insert --the public--
line 67, change "to help" to --helping--

Col. 2, line 25, delete "an"
line 35, correct the spelling of "portage"
line 39, change "portage-fee" to --portage fee--

Col. 3, line 1, change "said bulding" to --the building--
line 19, after "view" insert --, respectively,--
line 28, after "12," insert --a--
line 44, after "24," insert --and--
line 50, change "as" to --in response to--
line 55, delete "--."

UNITED STATES PATENT AND TRADEMARK OFFICE
CERTIFICATE OF CORRECTION

PATENT NO. : 4,836,352
DATED : June 6, 1989
INVENTOR(S) : Kunio Tateno et al.

It is certified that error appears in the above-identified patent and that said Letters Patent is hereby corrected as shown below:

Col. 4, line 30, after "has" insert --a--
line 31, change "If" to --It--
line 36, change "on" to --in--
line 39, change "on" to --in--
line 42, change "And" to --and--
line 51, change "into" to --onto--
line 53, delete "a"
line 55, delete "things"

Col. 5, line 3, change "fifty-one" to --50--
line 5, change ";" to --labeled--
line 23, change "output" to --outputted--
line 35, change "input" to --inputted--
line 50, after "to" insert --a--
line 61, after "to" insert --the--
line 66, after "to" insert --a--

UNITED STATES PATENT AND TRADEMARK OFFICE
CERTIFICATE OF CORRECTION

PATENT NO. : 4,836,352

DATED : June 6, 1989

INVENTOR(S) : Kunio Tateno et al.

It is certified that error appears in the above-identified patent and that said Letters Patent is hereby corrected as shown below:

Col. 6, line 31, change "drives" to --drive--
line 54, change "Welcone" to --Welcome!--
line 56, after "Welcome" insert --.--
Col. 7, line 62, after "has" insert --not--
Col. 8, line 42, change "S69" to --S59--
Col. 9, line 41, change "changes" to --change--
Col. 10, line 2, change "the" to --a--
line 44, after "16" insert --.--
line 45, change "the clime" to --a crime--; and change "the" (second occurrence) to --any--
line 58, change "data" to --day--
Col. 12, claim 12, line 41, change "placed" to --stored--
claim 18, line 66, change "destination" to --destinations--

UNITED STATES PATENT AND TRADEMARK OFFICE

CERTIFICATE OF CORRECTION

PATENT NO. : 4,836,352

DATED : June 6, 1989

INVENTOR(S) : Kunio Tateno, et al.

It is certified that error appears in the above-identified patent and that said Letters Patent is hereby corrected as shown below:

Col. 13, claim 19, line 14, change "input" to --inputted--

Col. 14, claim 20, line 15, after "splope" insert --means--

Signed and Sealed this

Eighth Day of May, 1990

*Attest:*

HARRY F. MANBECK, JR.

*Attesting Officer*

*Commissioner of Patents and Trademarks*